(12) United States Patent
Lu et al.

(10) Patent No.: US 11,977,488 B2
(45) Date of Patent: May 7, 2024

(54) CACHE PREFETCHING METHOD AND SYSTEM BASED ON K-TRUSS GRAPH FOR STORAGE SYSTEM, AND MEDIUM

(71) Applicant: SUN YAT-SEN UNIVERSITY, Guangdong (CN)

(72) Inventors: Yutong Lu, Guangdong (CN); Zhiguang Chen, Guangdong (CN); Jia Ma, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 1 day.

(21) Appl. No.: 17/916,033

(22) PCT Filed: Jun. 23, 2020

(86) PCT No.: PCT/CN2020/097670
§ 371 (c)(1),
(2) Date: Sep. 30, 2022

(87) PCT Pub. No.: WO2021/208238
PCT Pub. Date: Oct. 21, 2021

(65) Prior Publication Data
US 2023/0169005 A1    Jun. 1, 2023

(30) Foreign Application Priority Data
Apr. 14, 2020   (CN) .................. 202010290123.9

(51) Int. Cl.
*G06F 12/0862*  (2016.01)
*G06F 12/02*  (2006.01)
*G06F 12/0804*  (2016.01)

(52) U.S. Cl.
CPC ...... *G06F 12/0862* (2013.01); *G06F 12/0246* (2013.01); *G06F 12/0804* (2013.01)

(58) Field of Classification Search
None
See application file for complete search history.

(56) References Cited

U.S. PATENT DOCUMENTS

2019/0073308 A1*  3/2019  Charles ............... G06F 12/0862
2021/0089452 A1*  3/2021  Peng ................ G06F 16/24552

FOREIGN PATENT DOCUMENTS

| CN | 102111448 | 6/2011 |
| CN | 106844500 | 6/2017 |

(Continued)

OTHER PUBLICATIONS

Gu, Peng, et al. A Novel Weighted-Graph-Based Grouping Algorithm for Metadata Prefetching, IEEE Transactions on Computers vol. 59. Jan. 2010 (Year: 2010).*

(Continued)

*Primary Examiner* — Prasith Thammavong
*Assistant Examiner* — Edmund H Kwong
(74) *Attorney, Agent, or Firm* — JCIP GLOBAL INC.

(57) ABSTRACT

Provided in the present invention are a K-Truss graph-based storage system cache prefetching method, a system, and a medium, where method steps of the present invention include: when a data request stream in a system arrives, an access mode of the data request stream is determined; if said mode is a sequence mode, then n sequence blocks after a data block corresponding to the data request stream are prefetched and serve as prefetch data; otherwise, the data block corresponding to the data request stream serves as a query vertex to query a K-Truss graph, a truss structure matching the query vertex is obtained, and data of a data block from within the truss structure is obtained and serves as prefetch data; the K-Truss graph is updated according to (Continued)

the data block corresponding to the data request stream; and lastly a prefetch data block is prefetched into a main memory.

10 Claims, 5 Drawing Sheets

(56) References Cited

FOREIGN PATENT DOCUMENTS

| | | |
|---|---|---|
| CN | 107943882 | 4/2018 |
| WO | 2015008358 | 1/2015 |

OTHER PUBLICATIONS

Chen, Wei, "Research on Query Processing Method for Large Scale Graph", School of Information Science and Engineering, Yanshan University, Mar. 2020, pp. 1-128.

"International Search Report (Form PCT/ISA/210) of PCT/CN2020/097670," dated Jan. 14, 2021, with English translation thereof, pp. 1-4.

* cited by examiner

CACHE PREFETCHING METHOD AND SYSTEM BASED ON K-TRUSS GRAPH FOR STORAGE SYSTEM, AND MEDIUM

CROSS-REFERENCE TO RELATED APPLICATION

This application is a 371 application of the international PCT application serial no. PCT/CN2020/097670, filed on Jun. 23, 2020, which claims the priority benefit of China application no. 202010290123.9, filed on Apr. 14, 2020. The entirety of each of the above-mentioned patent applications is hereby incorporated by reference herein and made a part of this specification.

TECHNICAL FIELD

The invention belongs to the field of performance optimization of storage systems, and particularly relates to a cache prefetching method and system based on K-Truss graph for storage system, and a medium, which are used for analyzing the correlation of data blocks of the storage system to optimize cache prefetching.

RELATED ART

A memory is an important part of a modern computer system. How to manage the memory effectively not only affects the performance of the memory, but also directly affects the performance of the whole computer system. Ideally, the memory should be very fast, can keep up with the speed of a processor, and has a large storage capacity and low price, but current storage devices cannot meet the three conditions at the same time. Capacity, speed and price are mutually exclusive. The solution to this problem is to use multiple storage components to form a hierarchical structure. The most typical example is a three-level memory model, of which a highest level is a CPU register, a middle level is a main memory, and a bottom level is an auxiliary memory. Because there are few CPU registers, the relationship between the main memory and the auxiliary memory is very important. The main memory has a small capacity but a fast speed, while the auxiliary memory has a large capacity but a slow speed. All the data of users are stored in the auxiliary memory, and the main memory serves as a buffer between the processor and the auxiliary memory. When users request data, they will first check whether there is a copy in the main memory. If the data requested by the user can be found in the main memory every time, the IO performance of the system will be significantly improved. However, because the capacity of the main memory is far smaller than that of the auxiliary memory, only a small part of the data can be stored in the main memory at a specific time. Because the amount of data processed by users is random and huge during the use of a computer, the real-time control of the data stored in the main memory has a great impact on the overall performance of the system.

In order to realize effective management of the data in the main memory, researchers have tried to use a variety of ways to predict the data that may be accessed at some time in the future according to historical access records of users, and prefetch these data into the main memory before the data are accessed, so that when users need to access these data, the data can be accessed easily. In this case, the performance of the system will be very high.

Among these methods, most of them are to identify a sequential access pattern, because the sequential access pattern only needs to be identified according to the offset of a logical address in an IO request of the user, and the algorithm is simple. For example, according to OBL (One Block Lookahead) and evolved similar algorithms thereof, when prefetching is triggered, a request block prefetches a data blocks, while according to AMP (Adaptivate Multi-stream Prefetching), multiple queues are used to record an address of each access, and prefetching is triggered when a currently accessed address is continuous with an address in a previous queue. This is very effective in video servers, audio servers and other servers, because most of the data request streams in these servers are sequential. However, the access of Web applications and the like is branch access based on links and database applications often need random access, in which cases the sequential prefetching algorithm cannot find the potential association, so the effect is poor or even invalid.

Some algorithms are to identify a compound pattern between user request blocks. For example, C-miner, which is an offline algorithm, uses a frequent sequence mining algorithm to mine an access pattern between data blocks according to historical user IO request records, and then makes online prediction. An MMS or Nexus-like prefetching model generates prefetching decisions according to a probability graph formed between system files, which takes up huge space because files of the whole system need to be analyzed. In addition, there is no sequential access prefetching, so it is not universal. Therefore, most of the current prefetching algorithms cannot identify the sequential access pattern and the compound pattern at the same time, and some algorithms cannot meet the real-time requirement and occupy too much space.

SUMMARY OF INVENTION

Technical Problem

Technical problem to be solved by the invention: In view of the above problems in the prior art, the invention provides a cache prefetching method and system based on K-Truss graph for storage system, and a medium to improve the performance of the storage system and solve the problem of cache prefetching. The invention can improve the hit rate of memory data blocks, maximize the performance of the storage system, improve the hit rate of a cache, shorten the response time, reduce the interrupt latency of a central processing unit and improve the utilization rate of a processor.

Solution to Problem

In order to solve the above problems, the present invention adopts the following technical solutions:

A cache prefetching method based on K-Truss graph for storage system, comprising the following steps:
1) when a data request stream in the system arrives, determining whether an access pattern of the data request stream is sequential pattern, if so, jumping to step 2), and otherwise, jumping to step 3);
2) prefetching n sequential blocks after a data block corresponding to the data request stream as prefetched data, and jumping to step 4);
3) using the data block corresponding to the data request stream as a query point to query the K-Truss graph to obtain a truss structure matched with the query point, obtaining data of a data block in the truss structure as prefetched data, and updating the K-Truss graph according to the data block corresponding to the data request stream; and 4) prefetching a prefetched data block into a main memory, ending and exiting.

Optionally, the K-Truss graph is an undirected graph composed of nodes and connected edges, where each node represents a data block, and each connected edge indicates that a sequential association exists between connected nodes.

Optionally, using the data block corresponding to the data request stream as a query point to query the K-Truss graph to obtain a truss structure matched with the query point in step 3) specifically comprises: taking the data block corresponding to the data request stream as the query point, and taking out a truss structure with the highest value of the compactness coefficient k containing the data block in the K-Truss graph through a K-Truss query algorithm.

Optionally, updating the K-Truss graph according to the data block corresponding to the data request stream in step 3) specifically comprises:

A1) combining the data block corresponding to the data request stream with a data block in a history window and updating an edge combination record table, wherein the edge combination record table records the number of times each combination appears;

A2) determining whether the number of times a newly generated combination appears exceeds a preset threshold T according to the edge combination record table, ending the update of the K-Truss graph and exiting if not, and otherwise, jumping to step A3);

A3) inserting the newly generated combination into the K-Truss graph; and

A4) adding the data block corresponding to the data request stream into the history window.

Optionally, a combination form generated in step A1) is {pre,next}, where pre and next are data block addresses, next represents an address of the data block corresponding to the data request stream, and pre represents an address of a previous data block corresponding to next in the history window.

Optionally, the step A3) specifically comprises: firstly, determining whether two data blocks in a newly generated combination already exist in the K-Truss graph, and if any data block does not exist in the K-Truss graph, adding a corresponding node in the K-Truss graph; and then, determining whether the two data blocks in the newly generated combination already have a connected edge in the K-Truss graph, and if not, adding a corresponding connected edge in the K-Truss graph.

Optionally, the step 4) also comprises the step of performing K-Truss graph attenuation, specifically comprising: calculating the utilization rate of the current prefetched data block; if the utilization rate is less than a first threshold $T_1$, generating a spare set of edge combination record table, history window and K-Truss graph, and updating the new edge combination record table, history window and K-Truss graph when updating the K-Truss graph according to the data block corresponding to the data request stream in step 3), wherein the new edge combination record table, history window and K-Truss graph do not provide the prefetching query function temporarily; and if the utilization rate is less than a second threshold $T_2$, replacing the currently used edge combination record table, history window and K-Truss graph with the spare edge combination record table, history window and K-Truss graph to provide the prefetching query function.

In addition, the present invention also provides a cache prefetching system based on K-Truss graph for storage system, comprising a computer device which is programmed or configured to execute the steps of the cache prefetching method based on K-Truss graph for storage system.

In addition, the present invention also provides a cache prefetching system based on K-Truss graph for storage system, comprising a computer device, wherein a memory of the computer device stores a computer program programmed or configured to execute the cache prefetching method based on K-Truss graph for storage system.

In addition, the present invention also provides a computer-readable storage medium, on which a computer program programmed or configured to execute the cache prefetching method based on K-Truss graph for storage system is stored.

Effects of Invention

Compared with the prior art, the invention has the following advantages.

1. The invention can identify sequential and compound access patterns at the same time, meet the conditions of online real-time prefetching, and update prefetching results with time, occupies little main memory space, and can improve the hit rate of memory data blocks, and maximize the performance of the storage system. The efficient prefetching strategy realized by the invention can improve the hit rate of a cache, shorten the response time, reduce the interrupt latency of a central processing unit and improve the utilization rate of a processor.

2. The invention can find the correlation between data blocks from another level while analyzing and prefetching system request streams, so as to provide a reference for the optimization of other aspects of the storage system.

DESCRIPTION OF EMBODIMENTS

In order to more clearly explain the technical scheme of the embodiments of this application, the drawings needed in the embodiments will be briefly introduced below. Obviously, the drawings described below are only some of the embodiments of this application. For those of ordinary skill in the art, other drawings can be obtained according to the provided drawings without any creative effort.

Figure 1:
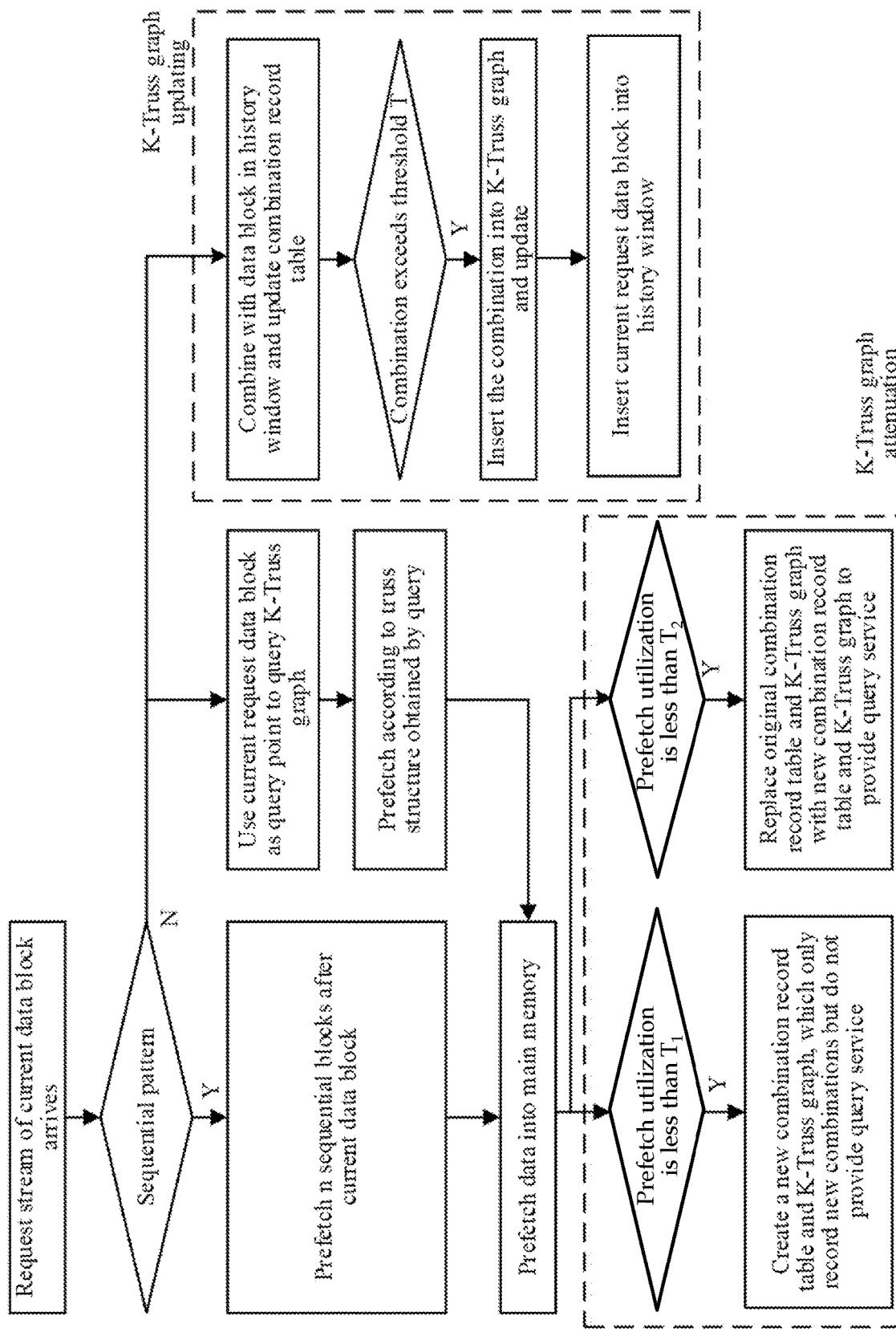
FIG. 1 is a flowchart of a method according to an embodiment of the invention.

As shown in FIG. 1, a cache prefetching method based on K-Truss graph for storage system in this embodiment comprises the following steps:

1) when a data request stream in the system arrives, determining whether an access pattern of the data request stream is sequential pattern, if so, jumping to step 2) (execute the sequential pattern), and otherwise, jumping to step 3) (execute a compound pattern);

2) prefetching n sequential blocks after a data block corresponding to the data request stream as prefetched data (the value of n may be specified to be the maximum value), and jumping to step 4);

3) using the data block corresponding to the data request stream as a query point to query the K-Truss graph to obtain a truss structure matched with the query point, obtaining data of a data block in the truss structure as prefetched data, and updating the K-Truss graph according to the data block corresponding to the data request stream; and 4) prefetching a prefetched data block into a main memory, ending and exiting.

Because some data accesses in data streams are of a sequential access pattern and sequentially accessed data blocks are originally connected, it is not helpful to discover the correlation of data blocks. Therefore, this embodiment also comprises the step 1) of identifying and filtering the data streams before using a K-Truss algorithm to identify the prefetched data, and only data streams that do not meet the sequential pattern will enter the step 3) where the K-Truss algorithm is used to identify the prefetched data.

The concept of K-Truss originated from the field of architecture, and was later applied to community discovery and community query problems to detect closely connected structures in social networks. Compared with other algorithms in the same field, it has the advantages that a defined structure is compact, and it has polynomial time complexity. The structure defined by K-Truss is that the number of triangles formed by each edge in the K-Truss structure is greater than or equal to k−2, where K is a compactness coefficient.

In this embodiment, the K-Truss graph is an undirected graph composed of nodes and connected edges, where each node represents a data block, and each connected edge indicates that a sequential association exists between connected nodes.

Figure 2:
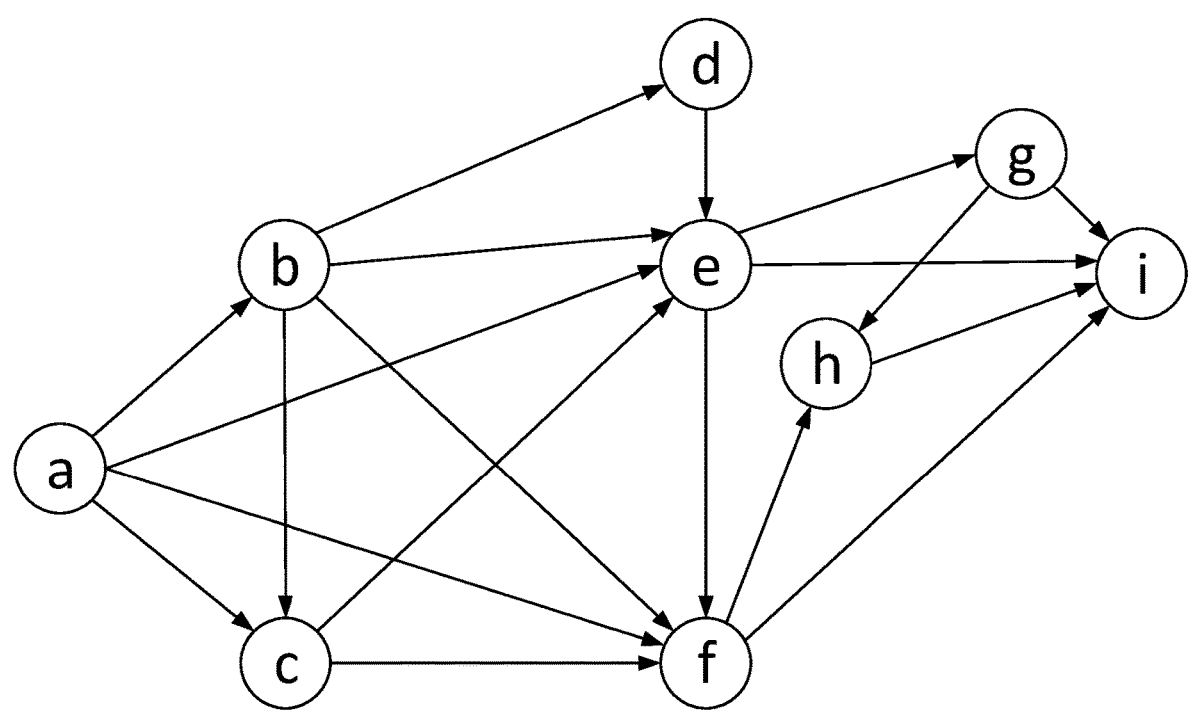
FIG. 2 is a directed graph of data blocks constructed according to the sequence relationship in an embodiment of the invention.
Figure 3:
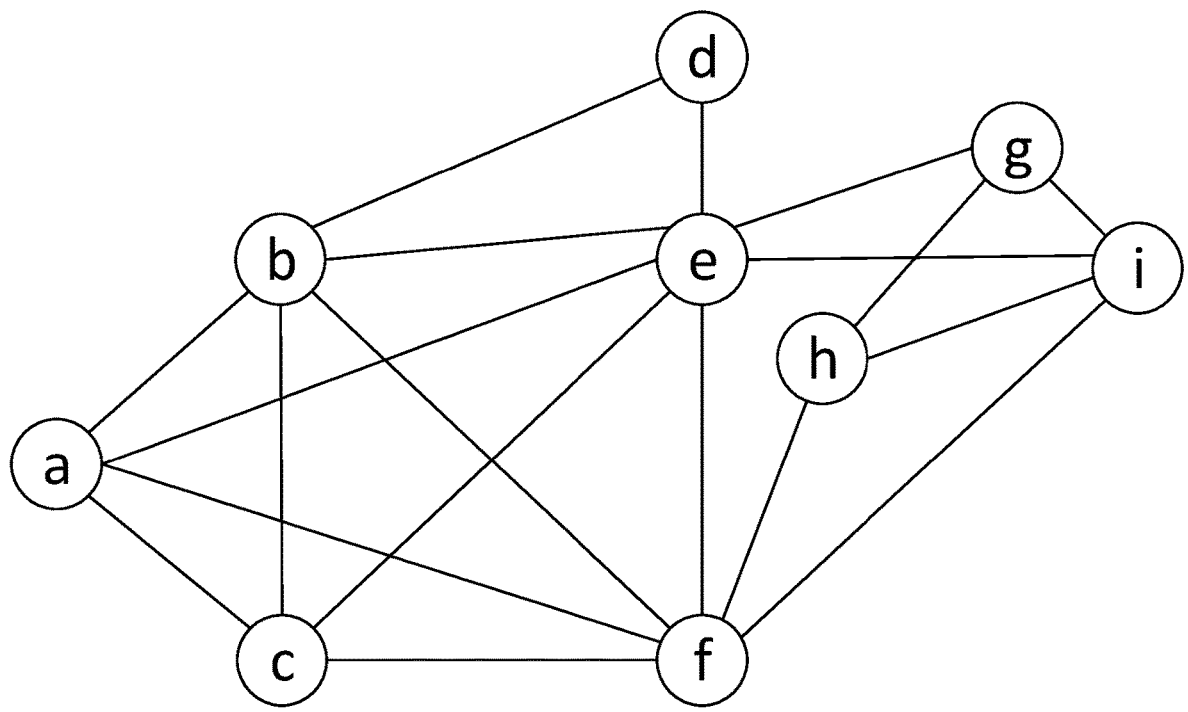
FIG. 3 is a K-Truss graph formed in FIG. 2.
Figure 4:
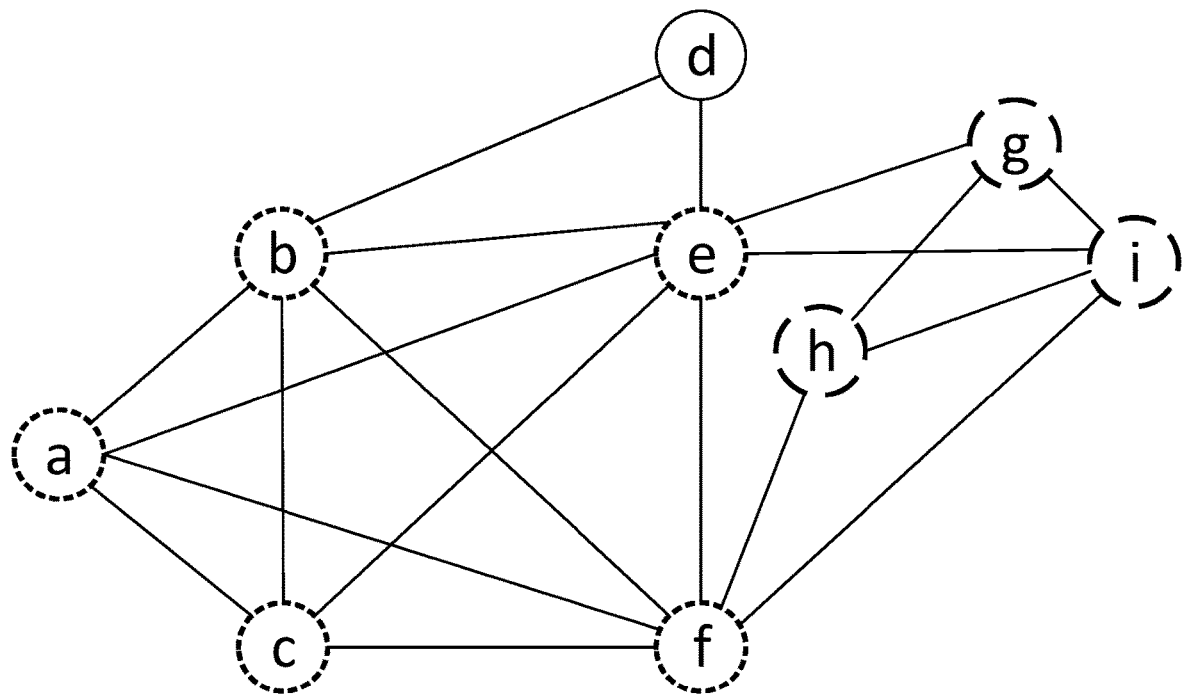
FIG. 4 is an exploded view of the K-Truss graph shown in FIG. 3.

A given K-Truss graph shows the correlation of data blocks for a specific time period. In addition, combinations in a combination record table are sequential, while the K-Truss graph is an undirected graph, but this does not affect the judgment of correlation to a certain extent. FIG. 2 is a directed graph composed of data blocks with sequential associations as nodes and the sequential associations as directed edges, FIG. 3 is a K-Truss graph corresponding to the directed graph shown in FIG. 2, and FIG. 4 is a decomposed K-Truss graph of FIG. 3, where a structure composed of nodes {a, b, c, e, f} is a 5-truss structure, each edge in this structure participates in the formation of three triangles, taking edge (a, b) as an example, triangles including edge (a, b) are $\Delta abc$, $\Delta abe$ and $\Delta abf$. It can be found in FIG. 4 that b participates in the formation of 3-truss {b, d, e} and 5-truss{a, b, c, e, f}. In FIG. 2, it can be seen that data blocks corresponding to 5-truss are more closely related, so it can be considered that the greater the value of the compactness coefficient k, the stronger the correlation.

In this embodiment, using the data block corresponding to the data request stream as a query point to query the K-Truss graph to obtain a truss structure matched with the query point in step 3) specifically comprises: taking the data block corresponding to the data request stream as the query point, and taking out a truss structure with the highest value of the compactness coefficient k containing the data block in the K-Truss graph through a K-Truss query algorithm (existing method, this embodiment does not involve the improvement of the K-Truss query algorithm).

As shown in FIG. 1, in this embodiment, updating the K-Truss graph according to the data block corresponding to the data request stream in step 3) specifically comprises:

A1) combining the data block corresponding to the data request stream with a data block in a history window and updating an edge combination record table, wherein the edge combination record table records the number of times each combination appears; in this embodiment, the history window is introduced to store a certain number of data blocks before a current I/O request data block, and the history window satisfies the FIFO (first in first out) characteristic; if the currently requested data block is a and a data block b exists in the history window, a combination of {b,a} will be generated, and 1 will be added to a record value of the combination {b,a} while updating the edge combination record table;

A2) determining whether the number of times a newly generated combination appears exceeds a preset threshold T according to the edge combination record table, ending the update of the K-Truss graph and exiting if not, and otherwise, jumping to step A3);

A3) inserting the newly generated combination into the K-Truss graph; and

A4) adding the data block corresponding to the data request stream into the history window.

Data requests of users are aggregated into an IO request stream similar to a queue in a computer, so data blocks in the request stream are arranged in sequence. Therefore, it can be considered that there may be a certain connection between data blocks that are close apart, and this connection is defined as a combination in this embodiment. In this embodiment, a combination form generated in step A1) is {pre,next}, where pre and next are data block addresses, next represents an address of the data block corresponding to the data request stream, and pre represents an address of a previous data block corresponding to next in the history window. The meaning of this combination is that when a data block with an address pre arrives, a data block with a logical address next will also be accessed in the near future. Each combination has a corresponding counter to indicate the number of times the combination appears.

In this embodiment, the number of times the combination appears is recorded by the edge combination record table. When a new request block arrives, the request block will be combined with each data block in the history window, and the combination count will increase by 1. We call a structure used to keep the numbers of times all the combinations appear a combination record table. When the count of a certain combination is greater than or equal to the threshold T, the combination will be added to the K-Truss graph and updated with an update algorithm. Existing K-Truss update algorithms, such as TCP-Index algorithm or EquiTruss algorithm, may be adopted as needed (this embodiment does not involve the improvement of K-Truss update algorithms). As can be seen from steps A1) to A4), in this embodiment, identification of the prefetched data using the K-Truss algorithm is specifically based on the history window, the edge combination record table and the K-Truss graph, and the functions of data block association identification and prefetching are completed by a combined pattern identifier composed of the history window, the edge combination record table and the K-Truss graph.

The meaning of the preset threshold T in step A2) is that two data blocks are considered to have a certain relationship only when the number of times their combination appears exceeds a certain value. The number of times the combination appears is also related to another factor, that is, the size of the history window in the compound pattern. Therefore, part of system history request streams can be extracted for analysis before prefetching, the distribution of the numbers of times all combinations appear when the size of the history window is specified is obtained, and the number of times corresponding to a certain proportion of edges is selected as a reference value of this threshold. In addition, only a first compound pattern identifier (composed of the history window, the edge combination record table and the K-Truss graph) needs the above process, because a second compound pattern identifier can be adjusted according to the combination record table in the previous compound pattern identifier when created.

In this embodiment, step A3) specifically comprises: firstly, determining whether two data blocks in a newly generated combination already exist in the K-Truss graph, and if any data block does not exist in the K-Truss graph, adding a corresponding node in the K-Truss graph; and then, determining whether the two data blocks in the newly generated combination already have a connected edge in the K-Truss graph, and if not, adding a corresponding connected edge in the K-Truss graph.

In this embodiment, step 3) implements the cache prefetching method based on previous correlation analysis of the K-Truss graph. When the request block arrives, the truss structure with the largest K value containing the data block can be taken out through the K-Truss query algorithm. However, since this graph is a directed graph and there may not be any edge prefixed with this data block in the structure with the largest K value, the prefetched data set is changed into a suffix set of this point in a truss structure with the largest K value containing an edge prefixed with this point or a set of directed spanning trees with this point as a root. In FIG. 4, a data block e participates in the formation of 3-truss {b, d, e}, 4-truss{e, f, g, h, i} and 5-truss{a, b, c, e, f}. As can be seen from FIG. 2, the data block e has no edge in the 5-truss structure, so the 4-truss structure is selected, and a corresponding suffix set and a directed spanning tree set rooted at e are both {f, g, h, i}, so this set is a prefetched data set.

Figure 5:
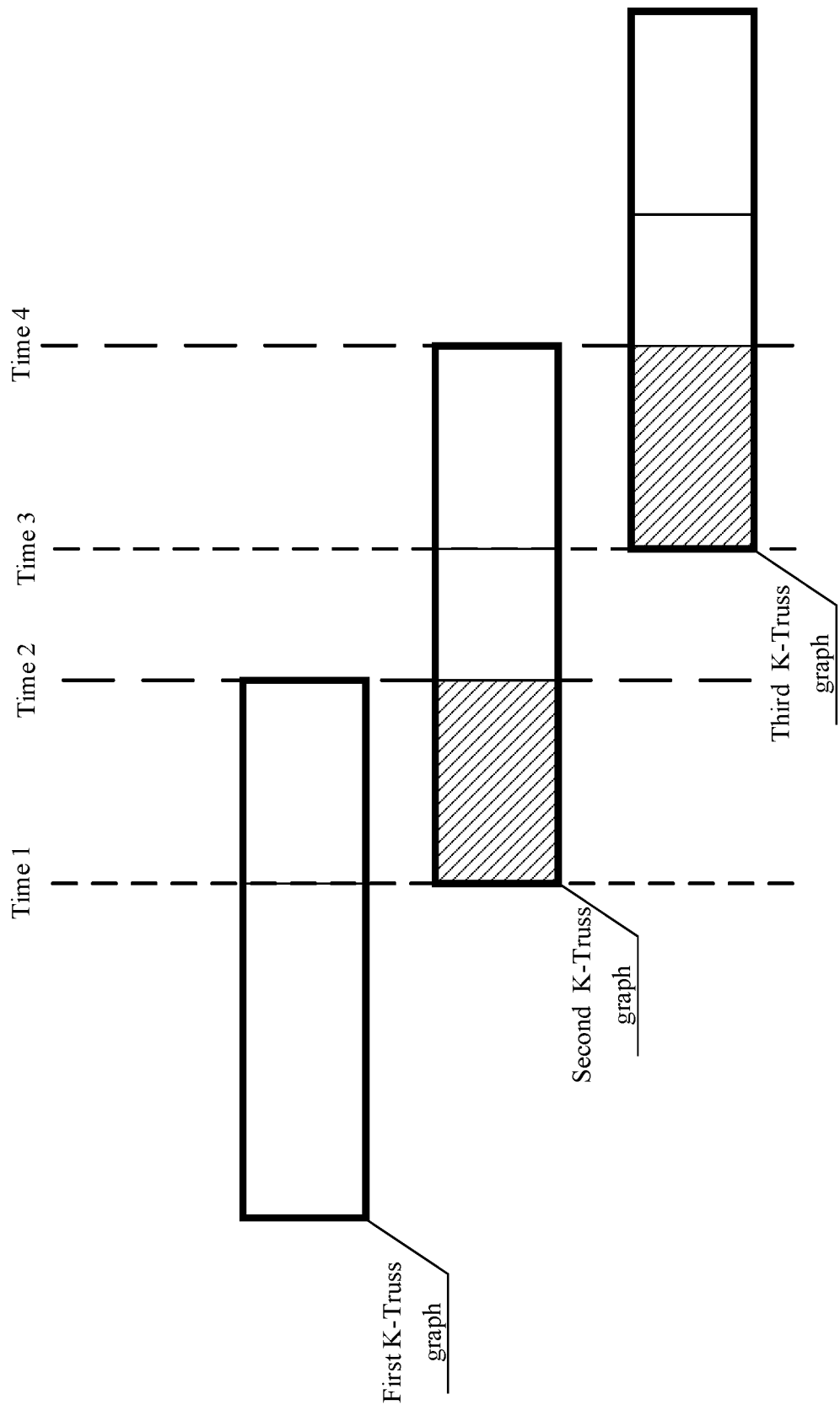
FIG. 5 is an attenuation principle diagram of a K-Truss graph in an embodiment of the invention.

On the one hand, due to the existence of the threshold T and endless data streams, the count of each combination will eventually exceed the threshold T, and the combination will be added to the K-Truss graph, thus forming a complete graph, and the correlation between data blocks cannot be found. On the other hand, due to the existence of write operation, data block information will be changed, which leads to the change of the correlation between data blocks. One fact that directly reflects the failure of data correlation is that a utilization rate of data blocks prefetched based on the previous K-Truss graph is reduced, so a method of attenuating the K-Truss graph is needed. As shown in FIG. 1, the step 4) in this embodiment also comprises the step of performing K-Truss graph attenuation, specifically comprising: calculating the utilization rate of the current prefetched data block; if the utilization rate is less than a first threshold $T_1$, generating a spare set of edge combination record table, history window and K-Truss graph, and updating the new edge combination record table, history window and K-Truss graph when updating the K-Truss graph according to the data block corresponding to the data request stream in step 3), wherein the new edge combination record table, history window and K-Truss graph do not provide the prefetching query function temporarily; and if the utilization rate is less than a second threshold $T_2$, replacing the currently used edge combination record table, history window and K-Truss graph with the spare edge combination record table, history window and K-Truss graph to provide the prefetching query function. As can be seen from the above description, in this embodiment, two time points are defined: one is when the utilization rate of the prefetched data of the K-Truss graph is less than the first threshold $T_1$, and the other is when the utilization rate of the prefetched data of the K-Truss graph is less than the second threshold $T_2$ ($T_1 > T_2$). The principle of K-Truss graph attenuation is shown in FIG. 5. Time 1 indicates that the prefetching utilization rate of a first K-Truss graph decreases to $T_1$, and in this case, a second K-Truss graph and a combination record table are created. The second K-Truss graph and the combination record table only record and store new combinations in the gray part, and do not provide prefetching strategies. Time 2 indicates that the prefetching utilization rate of the first K-Truss graph is reduced to $T_2$, the first K-Truss graph is discarded, and the second K-Truss graph is used to record and provide prefetching strategies. Time 3 and time 4 indicate that the prefetching utilization rate of the second K-Truss graph decreases to $T_1$ and $T_2$, and the alternate pattern of the second K-Truss graph and the third K-Truss graph is the same as above. The attenuation of the above K-Truss graph can prove the viewpoint that the correlation of data blocks displayed by a specified K-Truss graph is for a specific time period. The first threshold $T_1$ and the second threshold $T_2$ represent the life cycle control of one compound pattern identifier and the process of alternate updating between two compound pattern identifiers. Since the preset threshold T in step A2) is a fixed value, the number of times each combination appears will definitely gradually exceed this threshold over time. Therefore, it is necessary to update and iterate the compound pattern identifier. If a new compound pattern identifier is directly used to replace the old one, information in the new compound pattern identifier is empty, resulting in a gap period, during which the compound pattern identifier cannot provide the prefetch function. In addition, the selection of the first threshold 1 and the second threshold $T_2$ may be based on the principle that the first threshold $T_1$ is when it is 0.75 of an early prefetch utilization rate of the compound pattern identifier or other values, and $T_2$ is when it is 0.5 of the early prefetch utilization rate of the compound pattern identifier or other values, corresponding to a proportional value, indicating that information in the old compound pattern identifier is no longer applicable to a current request stream.

A key problem in the prefetching algorithm is when to prefetch. Because the process of prefetching data is costly, poor utilization of prefetched data will lead to problems such as wasting bandwidth, increasing delay and interfering with normal reading and writing operations. In the invention, the sequential pattern activates a sequential prefetching algorithm to prefetch data blocks when the data stream meets the sequential pattern; and when the prefetching effect is poor, a threshold of the number of activation times is increased, and sequential prefetching is performed only when the sequential pattern is met a certain number of times. The compound pattern queries each data block which does not meet the sequential pattern. When the prefetching effect of the compound pattern is inefficient, a query result can be processed, such as prefetching some data in the K-Truss query result. In addition, the same method as the sequential pattern may be adopted, that is, to use an activation threshold, and when the missing amount of blocks or data blocks which do not meet the sequential pattern reaches this value, compound pattern prefetching can be activated.

To sum up, the cache prefetching method based on K-Truss graph for storage system in this embodiment has the following advantages. (1) The method can identify sequential and compound access patterns at the same time, meet the conditions of online real-time prefetching, and update prefetching results with time, and occupies little main memory space. Moreover, the preset threshold T, the first threshold $T_1$, and the second threshold $T_2$ not only can maintain the accuracy of the compound pattern in the prefetching algorithm and the utilization rate of the prefetched data at a high level, but also can be adjusted without human intervention. More parameters make the model more applicable, so as to realize identification and prefetching of all kinds of complex data streams. Efficient prefetching strategies can improve the hit rate of a cache, shorten the response time, reduce the interrupt latency of a central processing unit and improve the utilization rate of a processor. (2) The method can find the correlation between data blocks from another level while analyzing and prefetching system request streams, so as to provide a reference for the optimization of other aspects of the storage system.

Figure 6:
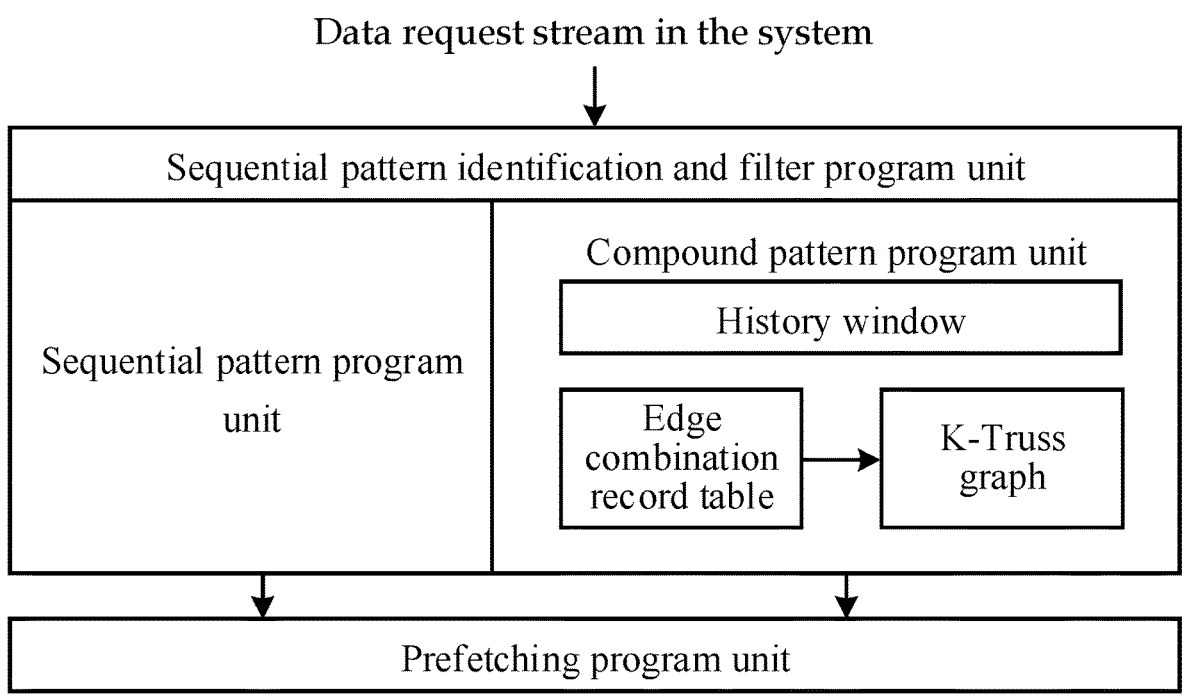
FIG. 6 is a block diagram of a system according to an embodiment of the invention.

As shown in FIG. 6, this embodiment also provides a cache prefetching system based on K-Truss graph for storage system, comprising:
  a sequential pattern identification and filter program unit configured to determine, when a data request stream in the system arrives, whether an access pattern of the data request stream is sequential pattern, if so, jump to a sequential pattern program unit, and otherwise, jump to a compound pattern program unit;
  the sequential pattern program unit, configured to prefetch n sequential blocks after a data block corresponding to the data request stream as prefetched data, and jump to a prefetching program unit;
  the compound pattern program unit, configured to use the data block corresponding to the data request stream as a query point to query the K-Truss graph to obtain a truss structure matched with the query point, obtain data of a data block in the truss structure as prefetched data, and update the K-Truss graph according to the data block corresponding to the data request stream; and
  the prefetching program unit, configured to prefetch a prefetched data block into a main memory, end and exit.

In addition, this embodiment also provides a cache prefetching system based on K-Truss graph for storage system, comprising a computer device which is programmed or configured to execute the steps of the aforementioned cache prefetching method based on K-Truss graph for storage system.

In addition, this embodiment also provides a cache prefetching system based on K-Truss graph for storage system, comprising a computer device, and a memory of the computer device stores a computer program programmed or configured to execute the aforementioned cache prefetching method based on K-Truss graph for storage system.

In addition, this embodiment also provides a computer-readable storage medium, on which a computer program programmed or configured to execute the aforementioned cache prefetching method based on K-Truss graph for storage system is stored.

Those skilled in the art will appreciate that the embodiments of the invention may be provided as methods, systems, or computer program products. Therefore, the invention may take the form of a full hardware embodiment, a full software embodiment, or an embodiment combining software and hardware aspects. Furthermore, the present application may take the form of a computer program product implemented on one or more computer usable storage media (including but not limited to magnetic disk memory, CD-ROM, optical memory, etc.) having computer usable program code embodied therein. The invention is described with reference to flowcharts and/or block diagrams of the method, equipment (system), and computer program product according to the embodiments of the invention. It should be understood that each flow and/or block in the flowcharts and/or block diagrams, and combinations of flows and/or blocks in the flowcharts and/or block diagrams, may be implemented by computer program instructions. These computer program instructions may be provided to a processor of a general purpose computer, special purpose computer, embedded processor, or other programmable data processing apparatus to produce a machine, such that the instructions executed by the processor of the computer or other programmable data processing apparatus produce a device for implementing the functions specified in one or more flows in the flowcharts and/or one or more blocks in the block diagrams. These computer program instructions may also be stored in a computer-readable memory which can direct a computer or other programmable data processing apparatus to function in a particular manner, such that the instructions stored in the computer-readable memory produce an article of manufacture including an instruction device which implements the functions specified in one or more flows in the flowcharts and/or one or more blocks in the block diagrams. These computer program instructions may also be loaded onto a computer or other programmable data processing apparatus such that a series of operational steps are performed on the computer or other programmable apparatus to produce a computer implemented process, such that the instructions executed on the computer or other programmable apparatus provide steps for implementing the functions specified in one or more flows in the flowcharts and/or one or more blocks in the block diagrams.

The above are only preferred embodiments of the invention, and the scope of protection of the invention is not limited to the above embodiments, but all technical schemes within the concept of the invention fall within the scope of protection of the invention. It should be noted that several improvements or embellishments made by those of ordinary skill in the art without departing from the principles of the invention should also be regarded as the scope of protection of the invention.

What is claimed is:
1. A cache prefetching method based on K-Truss graph for storage system, comprising the following steps:
  1) when a data request stream in the system arrives, determining whether an access pattern of the data request stream is sequential pattern, if so, jumping to step 2), and otherwise, jumping to step 3);
  2) prefetching n sequential blocks after a data block corresponding to the data request stream as prefetched data, and jumping to step 4);
  3) using the data block corresponding to the data request stream as a query point to query a K-Truss graph to obtain a truss structure matched with the query point, obtaining data of a data block in the truss structure as prefetched data, and updating the K-Truss graph according to the data block corresponding to the data request stream; and

4) transferring the prefetched data into a main memory, ending and exiting.

2. The cache prefetching method based on K-Truss graph for storage system according to claim 1, wherein the K-Truss graph is an undirected graph composed of nodes and connected edges, where each of the nodes represents a data block, and each of the connected edges indicates that a sequential association exists between connected nodes.

3. The cache prefetching method based on K-Truss graph for storage system according to claim 1, wherein using the data block corresponding to the data request stream as the query point to query the K-Truss graph to obtain the truss structure matched with the query point in step 3) specifically comprises: taking the data block corresponding to the data request stream as the query point, and taking out a truss structure with a highest value of a compactness coefficient k containing the data block corresponding to the data request stream in the K-Truss graph through a K-Truss query algorithm.

4. The cache prefetching method based on K-Truss graph for storage system according to claim 1, wherein updating the K-Truss graph according to the data block corresponding to the data request stream in step 3) specifically comprises:
   A1) combining the data block corresponding to the data request stream with a data block in a history window and updating an edge combination record table, wherein the edge combination record table records number of times each combination appears;
   A2) determining whether a number of times a newly generated combination appears exceeds a preset threshold T according to the edge combination record table, ending the update of the K-Truss graph and exiting if not, and otherwise, jumping to step A3);
   A3) inserting the newly generated combination into the K-Truss graph; and
   A4) adding the data block corresponding to the data request stream into the history window.

5. The cache prefetching method based on K-Truss graph for storage system according to claim 4, wherein a combination form generated in step A1) is {pre,next}, where the pre and the next are data block addresses, the next represents an address of the data block corresponding to the data request stream, and the pre represents an address of a previous data block corresponding to the next in the history window.

6. The cache prefetching method based on K-Truss graph for storage system according to claim 4, wherein step A3) specifically comprises: firstly, determining whether two data blocks in a newly generated combination already exist in the K-Truss graph, and if any data block in the newly generated combination does not exist in the K-Truss graph, adding a corresponding node in the K-Truss graph; and then, determining whether the two data blocks in the newly generated combination already have a connected edge in the K-Truss graph, and if not, adding a corresponding connected edge in the K-Truss graph.

7. The cache prefetching method based on K-Truss graph for storage system according to claim 1, wherein the step 4) further comprises a step of performing K-Truss graph attenuation, specifically comprising: calculating a utilization rate of a current prefetched data block; if the utilization rate is less than a first threshold T1, generating a spare set of edge combination record table, history window and K-Truss graph, and updating the spare set of edge combination record table, history window and K-Truss graph when updating the K-Truss graph according to the data block corresponding to the data request stream in step 3), wherein the spare set of edge combination record table, history window and K-Truss graph do not provide a prefetching query function temporarily; and if the utilization rate is less than a second threshold T2, replacing a currently used edge combination record table, history window and K-Truss graph with the spare set of edge combination record table, history window and K-Truss graph to provide the prefetching query function.

8. A cache prefetching system based on K-Truss graph for storage system, comprising a computer device which is programmed or configured to execute the steps of the cache prefetching method based on K-Truss graph for storage system according to claim 1.

9. A cache prefetching system based on K-Truss graph for storage system, comprising a computer device, wherein a memory of the computer device stores a computer program programmed or configured to execute the cache prefetching method based on K-Truss graph for storage system according to claim 1.

10. A non-transitory computer-readable storage medium, on which a computer program programmed or configured to execute the cache prefetching method based on K-Truss graph for storage system according to claim 1 is stored.

* * * * *